G. A. WILLIS.
NUTCRACKER.
APPLICATION FILED MAY 18, 1915.

1,243,121.

Patented Oct. 16, 1917.
2 SHEETS—SHEET 1.

Inventor:
Gail A. Willis
By Vernon E. Hodge
his Atty.

G. A. WILLIS.
NUTCRACKER.
APPLICATION FILED MAY 18, 1915.
1,243,121.
Patented Oct. 16, 1917.
2 SHEETS—SHEET 2.
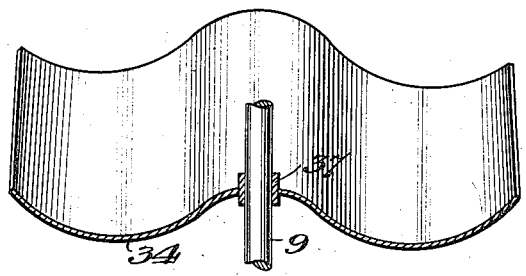
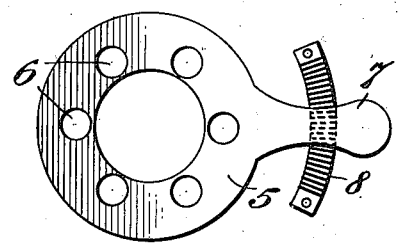
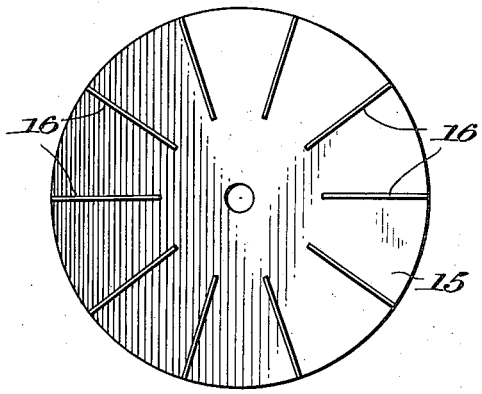
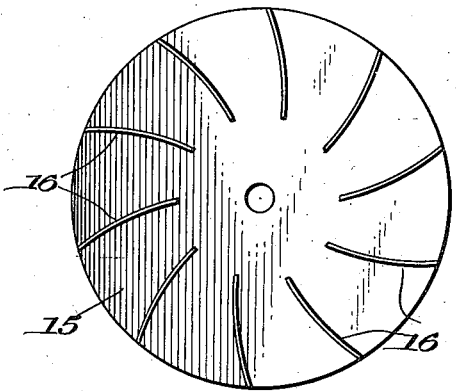
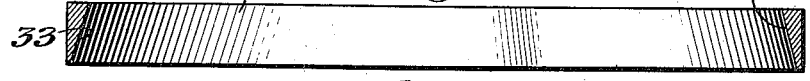
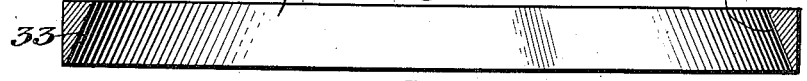
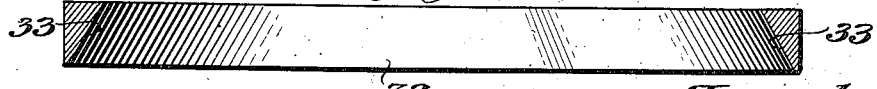

UNITED STATES PATENT OFFICE.

GAIL A. WILLIS, OF DENVER, COLORADO.

NUTCRACKER.

1,243,121.    Specification of Letters Patent.    Patented Oct. 16, 1917.

Application filed May 18, 1915. Serial No. 28,863.

*To all whom it may concern:*

Be it known that I, GAIL A. WILLIS, a citizen of the United States, residing at the city and county of Denver and State of Colorado, have invented certain new and useful Improvements in Nutcrackers, of which the following is a specification.

This invention relates to an improvement in nut-hullers or crackers, and the object is to provide an apparatus for breaking the shells of nuts of the character of hazelnuts, filberts, almonds, peanuts, English walnuts, pecans, piñons, and the like.

The invention consists of a rotary member which receives the nuts from a hopper, and as the rotary member is rotated, the nuts are discharged from the periphery thereof against the wall of the huller, causing the shells of the nuts to be broken, whereby the meats or kernels of the nuts will be removed or made accessible, so that the meats or kernels can be easily removed from the shells.

The invention consists of certain other novel features of construction and combinations of parts which will be hereinafter fully described and pointed out in the claim.

In the accompanying drawings:—

Fig. 2 is a cross-sectional view of the discharge apron;

Fig. 3 is a plan view of the cut-off or valve;

Fig. 4 is a plan view of the rotary member or disk;

Fig. 5 is a plan view of a slightly modified form of rotary disk;

Figs. 7, 8, 9 and 10 are detail sectional views of various forms of cracking-rings.

Figure 1:
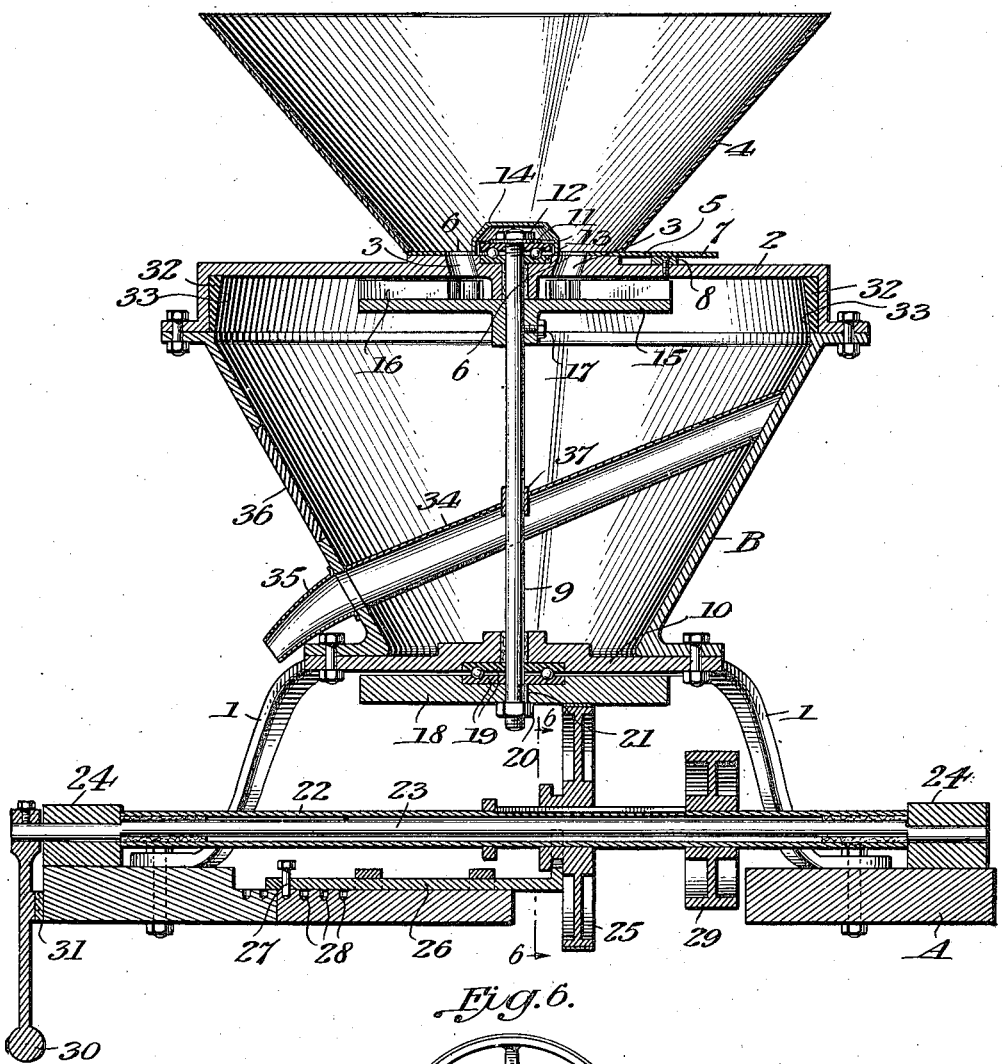
Figure 1 is a longitudinal vertical sectional view of the invention.
Figure 6:
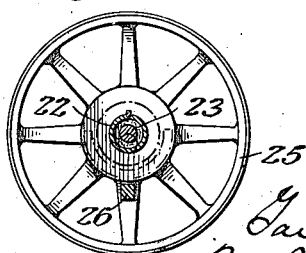
Fig. 6 is a sectional view through the eccentric shaft showing the manner of releasing the friction-wheel.

A, represents the base, and B is the huller which is supported upon the base by means of legs 1, 1. A cover 2 is removably supported upon the body of the huller B, and is provided with a plurality of openings 3 through which the nuts to be cracked are delivered into the huller from a hopper 4 mounted on the cover.

A valve or cut-off 5 is mounted upon the cover, and is provided with a plurality of openings 6 through which the nuts pass into the openings 3 formed in the cover. A handle 7 on the cut-off is provided with teeth adapted to enter notches formed in the bar 8 for holding the cut-off in its adjusted position.

A shaft 9 is journaled in the cover and base-plate or bottom 10. A washer 11 is mounted upon the shaft and is held in position by a nut 12, and located between the washer and the cover are disks 13 which form an anti-friction bearing for the shaft, and for supporting the shaft. A cap 14 is placed over the shaft, and the bearing is mounted upon the cover for keeping dust and foreign matter from the parts.

Mounted upon the shaft and located beneath the cover 2 is a rotary member or disk 15. This disk or member 15 is preferably provided with a plurality of radial blades, 16, which extend from the periphery toward the center of the disk, but are preferably of such a length as to form an unobstructed area at the center of the disk so that the nuts may pass from the hopper and through the cover on to the disk without being obstructed by the nearness of the blade 16.

A set-screw 17 secures the disk or member 15 to the shaft, and permits of the member being adjusted upon the shaft to the proper elevation. Secured to the lower end of the shaft is a friction-disk 18. Roller-bearings 19 are located between the disk and the base plate 10 to form an anti-friction bearing for the disk, and a nut 20 is screwed upon the shaft 9 for supporting the disk upon the shaft. The disk is fastened to the shaft by key or spline 21.

A hollow shaft 22 is mounted upon the base A, and has an eccentric shaft 23 mounted therein, which is eccentrically mounted in bearing-members 24. A driven wheel 25 is mounted upon the hollow shaft 22, and is provided with a friction surface or covering, such as leather, which is adapted to engage the surface of the disk 18 to transmit motion thereto.

A gear-shifter 26 is connected to the friction-wheel 25. A pin 27 is adapted to enter one of the openings 28 in the base A for fastening and holding the friction-wheel 25 in its adjusted position. This wheel 25 is moved with respect to the surface of the disk 18 for governing the speed of rotation of the shaft 9 and rotary member 15. As is well known, when this friction-wheel 25 is moved toward the periphery of the disk 18, the disk will rotate with slower speed than when the wheel 25 is moved toward the center.

A drive pulley 29 is mounted upon the hollow shaft 22, which is adapted to receive power from any suitable source for the purpose of rotating the shaft. A lever 30 is connected to the eccentric shaft 23 for rotating the shaft for disengaging the friction-clutch on the engagement between wheel 25 and disk 18. The rack-bar 31 is provided on the base A for holding the lever in its adjusted position.

Located upon the upper edge of the huller B under and clamped down by the cover 2, is a ring 32 which is provided with a beveled inner surface. The bevel face or surface 33 of the ring tapers downwardly toward the huller B, forming a deflecting surface for the nuts, the angle of this surface being governed by the variety of nut being cracked.

As the nuts are delivered to the rotary member 15, and the member has been set in motion, the speed of the member will cause the nuts to be thrown therefrom centrifugally against the cracking-ring 32. The nuts will be thrown against this ring with sufficient force to cause the shells to be broken, whereupon the meats and shells of the nuts will fall upon an inclined apron 34, and thence out through a spout 35. The surface of this apron is preferably made undulating or corrugated, to guide the nuts away from bushing 37. A door 36 is formed in the huller B through which access may be had to the interior of the huller when desired.

I claim:—

A centrifugal nut-cracker comprising a huller, a cover, a removable cracking-ring clamped between the huller and cover, rotary means for discharging the nuts to be cracked with force radially against the cracking-ring, an inclined apron for conducting the meats as they drop from the cracker out of the machine, means for rotating the centrifugal discharge at varying speeds, a hollow shaft for supporting said means, and an axially adjustable eccentric shaft extending through the hollow shaft for bodily varying the position of the hollow shaft, whereby to disconnect the transmission mechanism.

In testimony whereof I affix my signature, in the presence of two witnesses.

GAIL A. WILLIS.

Witnesses:
  CHAS. W. JEWETT,
  HAROLD H. HEALY.